United States Patent
Valdez et al.

(10) Patent No.: US 9,862,400 B2
(45) Date of Patent: *Jan. 9, 2018

(54) FOLDING BABY STROLLER SYSTEM AND METHOD

(71) Applicant: Baby Jogger, LLC, Richmond, VA (US)

(72) Inventors: Martin E. Valdez, Wapato, WA (US); James Blubaugh, Yakima, WA (US)

(73) Assignee: Racing Strollers, Inc., Union Gap, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,848

(22) Filed: Sep. 5, 2013

(65) Prior Publication Data

US 2015/0314798 A1 Nov. 5, 2015
US 2017/0267271 A9 Sep. 21, 2017

Related U.S. Application Data

(63) Continuation of application No. 13/524,289, filed on Jun. 15, 2012, now Pat. No. 8,550,489, which is a continuation of application No. 12/857,756, filed on Aug. 17, 2010, now Pat. No. 8,226,111, which is a continuation of application No. 12/041,137, filed on Mar. 3, 2008, now Pat. No. 7,798,515, which is a continuation of application No. 11/254,922, filed on Oct. 20, 2005, now Pat. No. 7,396,039, which is a continuation of application No. 10/430,688, filed on May 5, 2003, now Pat. No. 6,991,248.

(51) Int. Cl.
*B62B 7/06* (2006.01)

(52) U.S. Cl.
CPC .............. *B62B 7/062* (2013.01); *B62B 7/064* (2013.01); *B62B 2205/20* (2013.01)

(58) Field of Classification Search
CPC ........... B62B 7/062; B62B 7/064; B62B 7/00; B62B 7/044; B62B 7/08
See application file for complete search history.

(56) References Cited

U.S. PATENT DOCUMENTS

| | | | |
|---|---|---|---|
| 635,744 A * | 10/1899 | Catudal | B62K 21/16 403/96 |
| 663,195 A * | 12/1900 | McGuire | B62K 21/16 403/93 |
| 2,219,358 A | 10/1940 | Economides | |
| 3,471,892 A | 10/1969 | Fussneger | |
| 3,961,497 A | 6/1976 | Cohen | |
| 3,972,563 A | 8/1976 | Gustofasson | |
| 4,216,974 A * | 8/1980 | Kassai | B62B 7/062 280/42 |
| 4,412,688 A | 11/1983 | Giordani | |
| 4,524,890 A | 6/1985 | Fulton | |
| 4,544,178 A | 10/1985 | Al-Sheikh et al. | |

(Continued)

*Primary Examiner* — James A Shriver, II
*Assistant Examiner* — Steve Clemmons
(74) *Attorney, Agent, or Firm* — Eversheds Sutherland (US) LLP

(57) ABSTRACT

A baby stroller for transporting an infant at speeds faster than normal walking is disclosed. This baby stroller can be folded to make it easier to stow and transport. The folding mechanism, a unique feature of the design is directed toward compactness, ease of use, reliability, and reduction in manufacturing costs.

20 Claims, 12 Drawing Sheets

(56) References Cited

U.S. PATENT DOCUMENTS

| | | | |
|---|---|---|---|
| 4,834,403 A * | 5/1989 | Yanus | B60N 2/2848 |
| | | | 188/20 |
| 5,039,118 A | 8/1991 | Huang | |
| 5,056,805 A | 10/1991 | Wang | |
| 5,176,395 A | 1/1993 | Garforth-Bles | |
| 5,257,799 A | 11/1993 | Cone et al. | |
| 5,364,119 A | 11/1994 | Leu | |
| 5,421,603 A | 6/1995 | Wills et al. | |
| 5,520,474 A | 5/1996 | Liu | |
| 5,536,033 A | 7/1996 | Hinkston | |
| 5,590,896 A | 1/1997 | Eichhorn | |
| 5,611,560 A | 3/1997 | Thimming | |
| 5,617,592 A | 4/1997 | Cheng | |
| 5,617,594 A | 4/1997 | Chien | |
| 5,660,435 A | 8/1997 | Eichhorn | |
| 5,669,624 A | 9/1997 | Eichhorn | |
| 5,695,212 A | 12/1997 | Hinkston | |
| D409,531 S | 5/1999 | Baechler | |
| 6,086,284 A | 7/2000 | Callahan | |
| 6,095,548 A | 8/2000 | Baechler et al. | |
| 6,102,431 A * | 8/2000 | Sutherland | B62B 7/062 |
| | | | 280/47.17 |
| 6,102,432 A | 8/2000 | Cheng | |
| 6,105,998 A | 8/2000 | Baechler et al. | |
| D438,149 S | 2/2001 | Baechler | |
| 6,220,621 B1 * | 4/2001 | Newton | B62B 5/0023 |
| | | | 280/650 |
| 6,238,125 B1 * | 5/2001 | Lin | B62B 7/06 |
| | | | 403/102 |
| 6,312,005 B1 | 11/2001 | Lin | |
| 6,416,077 B1 | 7/2002 | Chen et al. | |
| 6,513,827 B1 | 2/2003 | Barenbrug | |
| 6,698,300 B2 | 3/2004 | Swan | |
| 6,722,690 B2 | 4/2004 | Lan | |
| 6,767,028 B2 | 7/2004 | Britton et al. | |
| 6,789,848 B2 | 9/2004 | Rauschenberger | |
| 6,869,096 B2 * | 3/2005 | Allen | B62B 7/062 |
| | | | 280/642 |
| 6,893,040 B2 | 5/2005 | Hou et al. | |
| 6,910,708 B2 | 6/2005 | Sack et al. | |
| 6,991,248 B2 * | 1/2006 | Valdez | B62B 7/08 |
| | | | 280/642 |
| 7,632,035 B2 * | 12/2009 | Cheng | B62B 7/008 |
| | | | 280/642 |
| 8,226,110 B2 * | 7/2012 | Liao | B62B 7/062 |
| | | | 280/47.38 |
| 8,282,120 B2 * | 10/2012 | Minato | B62B 7/062 |
| | | | 280/47.38 |
| 2003/0085551 A1 | 5/2003 | Allen et al. | |
| 2006/0038382 A1 | 2/2006 | Valdez et al. | |
| 2006/0061066 A1 | 3/2006 | Tan | |

\* cited by examiner

FOLDING BABY STROLLER SYSTEM AND METHOD

CROSS REFERENCE TO RELATED APPLICATIONS

This patent application claims priority under 35 U.S.C. §120 and is a continuation of U.S. Non-Provisional patent application Ser. No. 13/524,289, filed Jun. 15, 2012, of the same title and currently pending, which is a continuation of U.S. patent application Ser. No. 12/857,756, filed Aug. 17, 2010 (now U.S. Pat. No. 8,226,111), which is a continuation of U.S. patent application Ser. No. 12/041,137, filed Mar. 3, 2008 (now U.S. Pat. No. 7,798,515), which is a continuation of Ser. No. 11/254,922, filed Oct. 20, 2005 (now U.S. Pat. No. 7,396,039), which is a continuation of Ser. No. 10/430,688, filed May 5, 2003 (now U.S. Pat. No. 6,991,248).

BACKGROUND OF THE INVENTION

Field of the Invention

The present invention relates to baby strollers, and more particularly, to all-terrain baby strollers that can be folded.

Description of the Related Art

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

All-terrain baby strollers have been designed to overcome these Problems. These strollers typically employ much larger wheels, often large bicycle tires. The stroller frame members are constructed of metal tubular stock and durable plastic frame connectors or other durable material to connect the frame members together to handle the heavy duty use they may receive. The frame connectors are used also to rotate or pivot one frame member relative to another, and are used to removably connect other frame members together.

Some advanced designs of all-terrain strollers have allowed for a certain degree of folding of the all-terrain baby strollers into less than a desirable amount of compactness. In addition, conventional folding mechanisms include complications that increase cost and reduce reliability and ease of use.

BRIEF SUMMARY OF THE INVENTION

The present invention resides in a folding baby stroller system and method. Embodiments include a front wheel and left and right side laterally spaced-apart front wheel supports. Each of the left and right side front wheel supports has a forward end portion and a rearward end portion. The front wheel is mounted to the forward end portion of at least one of the front wheel supports, the left and right side front wheel supports being rotatable as a unit. Further included are left and right rear wheels, and left and right side laterally spaced-apart rear wheel supports. Each of the left and right side rear wheel supports has a lower end portion and an upper end portion, the lower end portions being coupled to at least one of the left and right rear wheels. Further included are left and right side laterally spaced-apart handle members. Each of the left and right side handle members has a forward end portion and a rearward end portion with a handle portion, the left and right side handle members being rotatable as a unit. Further included are left and right side laterally spaced-apart folding assemblies. Each of the left and right side folding assemblies has a first rotatable member and second rotatable member rotatably coupled to a pivot member supported by the upper end portion of a corresponding one of the left and right side rear wheel supports for rotation about a common axis of rotation and independently rotatable relative to each other. The rearward end portion of a corresponding one of the left and right side front wheel supports is fixedly attached to the first rotatable member, and the forward end portion of a corresponding one of the left and right side handle members is fixedly attached to the second rotatable member.

Other features and advantages of the invention will become apparent from the following detailed description, taken in conjunction with the accompanying drawings.

DETAILED DESCRIPTION OF THE INVENTION

Figure 1:
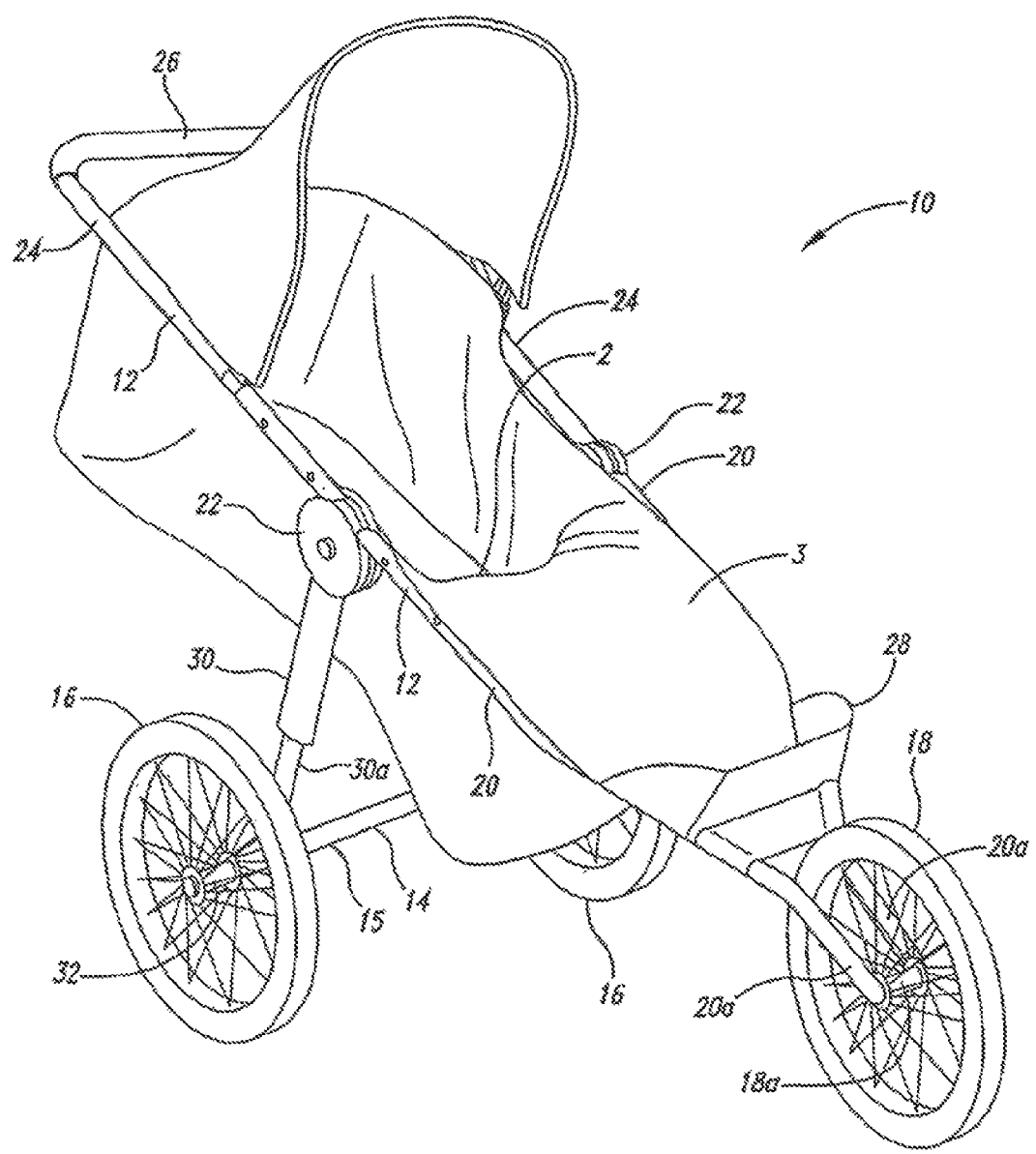
FIG. 1 is an isometric view of an exemplary implementation of a baby stroller embodying the present invention shown in a fully unfolded state ready for usage.

As shown in the drawings for purposes of illustration, the present invention is embodied in an all-terrain baby stroller 10, as shown in FIG. 1, having a foldable, tubular metal frame 12 and a transversely extending rear axle assembly 14 with a transverse, non-rotating tubular rear axle 15. Left and right side rear wheels 16 are rotatably mounted to the ends of the rear axle assembly 14. The forward end of the flame 12 has a single front wheel 18 rotatably mounted thereto.

The frame 12 has no base frame members extending rearwardly from the front wheel 18 to the rear axle assembly 14 as do most conventional all-terrain strollers. Instead, the frame 12 includes left and right side, downwardly and forwardly sloping front wheels frame members or supports 20, which each extend downward from a corresponding one of left and right side folding assemblies 22 in a converging configuration to the front wheel 18. A forward free-end 20a of each of the left and right side front wheel supports 20 has a plastic front wheel connector (not shown) fixedly attached thereto and a corresponding one of the left and right ends of an axle 18a of the front wheel 18 removably attached thereto to mount the front wheel to the stroller frame 12.

The front wheel supports 20 are interconnected by a foot rest 28 that spans between them toward but rearward of their forward free-ends 20a and that is fixedly attached to each at a position just above the front wheel 18 and just rearward of the axle 18a of the front wheel. As a result of the interconnection provided by the foot rest 28, and also the front wheel 18 when attached to the left and right side front wheel connectors, the left and right side front wheel supports 20 form a stationary unit with respect to the left and right side folding assemblies 24 upon folding and unfolding of the stroller 10, as will be described in greater detail below.

The frame 12 also includes left and right side, upwardly and rearwardly sloping handle frame members or supports 24, which each extend upward from the corresponding one of the left and right side folding assemblies 22 in a generally parallel configuration to a handle 26 extending between the left and right side handle supports. The handle 26 is covered by a foam grip. The handle supports 24 are interconnected by the handle 26 that spans between them at their rearwardmost and uppermost extension and that is fixedly attached to each.

As a result of the interconnection provided by the handle 26, the left and right side handle supports 24 move as a unit with respect to the left and right side folding assemblies 22 upon folding and unfolding of the stroller 10, as will be described in greater detail below. It is noted that in lieu of the interconnecting handle 26, the handle supports 24 may each be provided with a handle portion at the upper end thereof such as used with umbrella style strollers.

In the illustrated embodiment of the invention the left and right side handle supports 24 and the handle 26 are formed as an integral unit by bending a single length of aluminum tube. The left and right side handle supports 24 are movable relative to the left and right side front wheel supports 20 for folding of the stroller 10 and do not together form an integrated rigid upper frame. The left and right side handle supports 24 are also movable independent from movement of the left and right side front wheel supports 20.

The frame 12 also includes left and right side, downwardly and rearwardly sloping rear wheel frame members or supports 30, which each extend downward from the corresponding one of the left and right side folding assemblies 22 in a generally parallel configuration to the rear axle assembly 14. A rearward free-end 30a of each of the left and right side rear wheel supports 30 is fixedly attached to a corresponding one of the left and right ends of the tubular rear axle 15. The rear wheel supports 30 are interconnected by the rear axle assembly 14 that spans between them at the rearward free-ends 30a thereof. As a result of the interconnection provided by the rear axle assembly 14, the left and right side rear wheel supports 30 move as a unit with respect to the left and right folding assemblies 22 for folding and unfolding of the stroller 10, as will be described in greater detail below. The left and right side rear wheel supports 30 are also movable relative to the left and right side front wheel supports 20 and the left and right side handle supports 24 for folding of the stroller 10. Further, the left and right side rear wheel supports 30 and the rear axle assembly 14 connected thereto do not form a part of a base frame extending between the rear and front wheels 16 and 18. Much of the structural strength of the stroller 10 and the interconnection of the forward wheel supports 20, the handle supports 24, and the rearward wheel supports 30 are provided by the centrally positioned left and right side folding assemblies 22, and not by base frame.

In the illustrated embodiment of the stroller 10, the left and right side front wheel supports 20, the left and right side handle supports 24, and the left and right side rear wheel supports 30 are made from aluminum tube. Suitable alternative materials may be used.

The left and right outward ends of the tubular rear axle 15 are open and internally threaded to receive a threaded stub axle 32 forming a part of the corresponding one of the left and right rear wheels 16. A lock nut (not shown) when tightened against the face of the stub axle 32 locks the stub axle against loosening during usage of the stroller 10. Alternative constructions may be used to fixedly or removably attach the rear wheels 16 to the tubular rear axle 15, and any suitable alternative manner of mounting the rear wheels 16 to the real wheel supports 30 may be used with or without a park brake.

Figure 2:
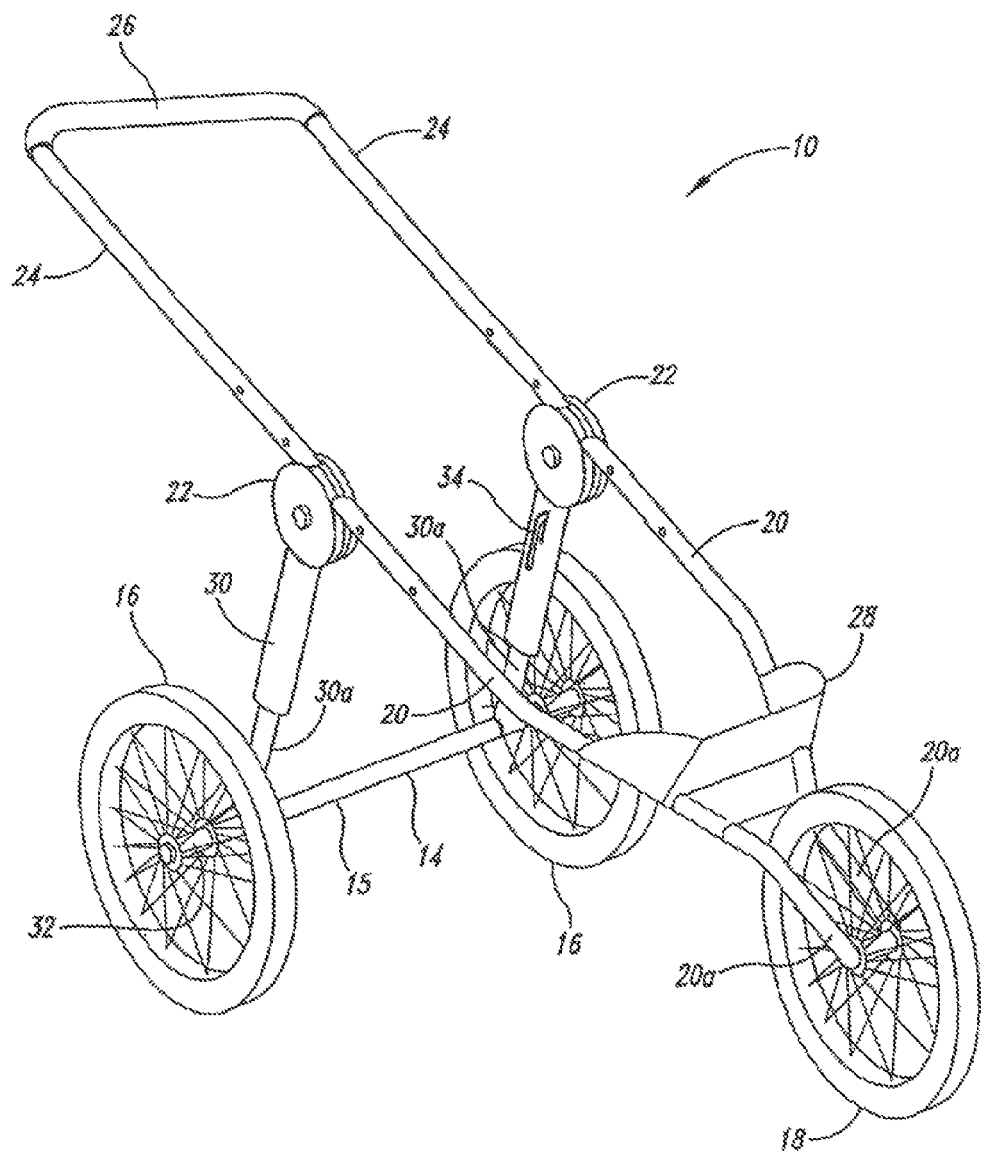
FIG. 2 is an isometric view of the stroller frame of FIG. 1 without a seat and a leg guard.

The frame 12 of the stroller 10 is shown in FIG. 1 in the fully unfolded state with a fabric seat 2, fabric leg support and guard 3. For purposes of illustration, the frame 12 is shown in FIG. 2 without the seat 2 and the leg guard 3. The seat 2 is suspended from the left and right side handle supports 24, and the leg guard 3 spans between and is supported by the left and right side front wheel supports 20.

Figure 3:
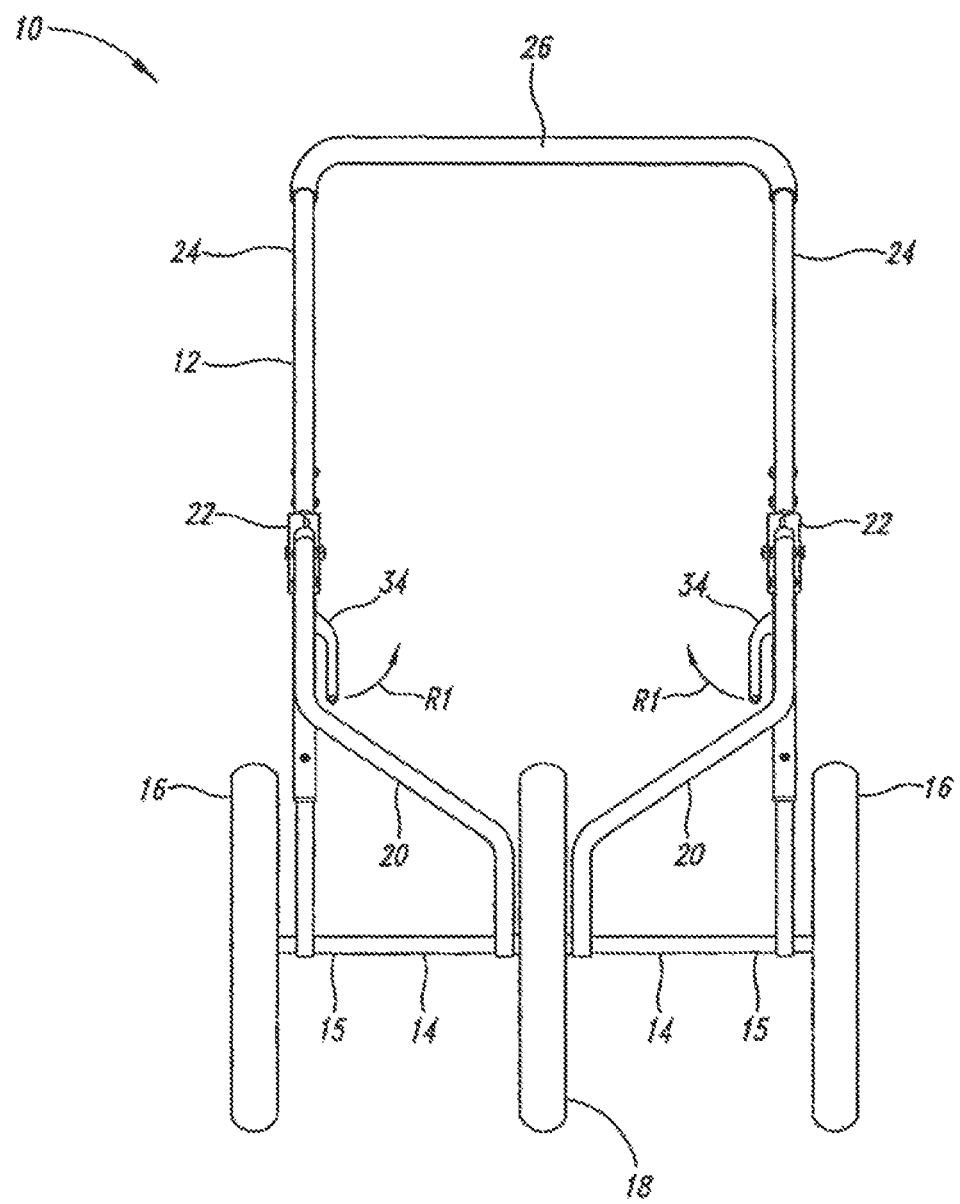
FIG. 3 is a front elevational view of the stroller frame of FIG. 2.

For the depicted implementation, user operation of the left and right side folding assemblies 22 will now be described. The left and right side folding assemblies 22 have the same construction, and the description below while in the singular is applicable to both. Each of the left and right rear wheel supports 30 supports an inwardly extending lever 34, which has a predominantly vertical orientation, as shown in FIG. 3, when the frame 12 of the stroller 10 is locked in the fully unfolded position. To begin the procedure to fold the frame 12, each of the levers 34 are pulled upward and inward as depicted by arrows R1 to thereby put the folding assemblies 22 in an unlocked state as further explained below.

Figure 4:
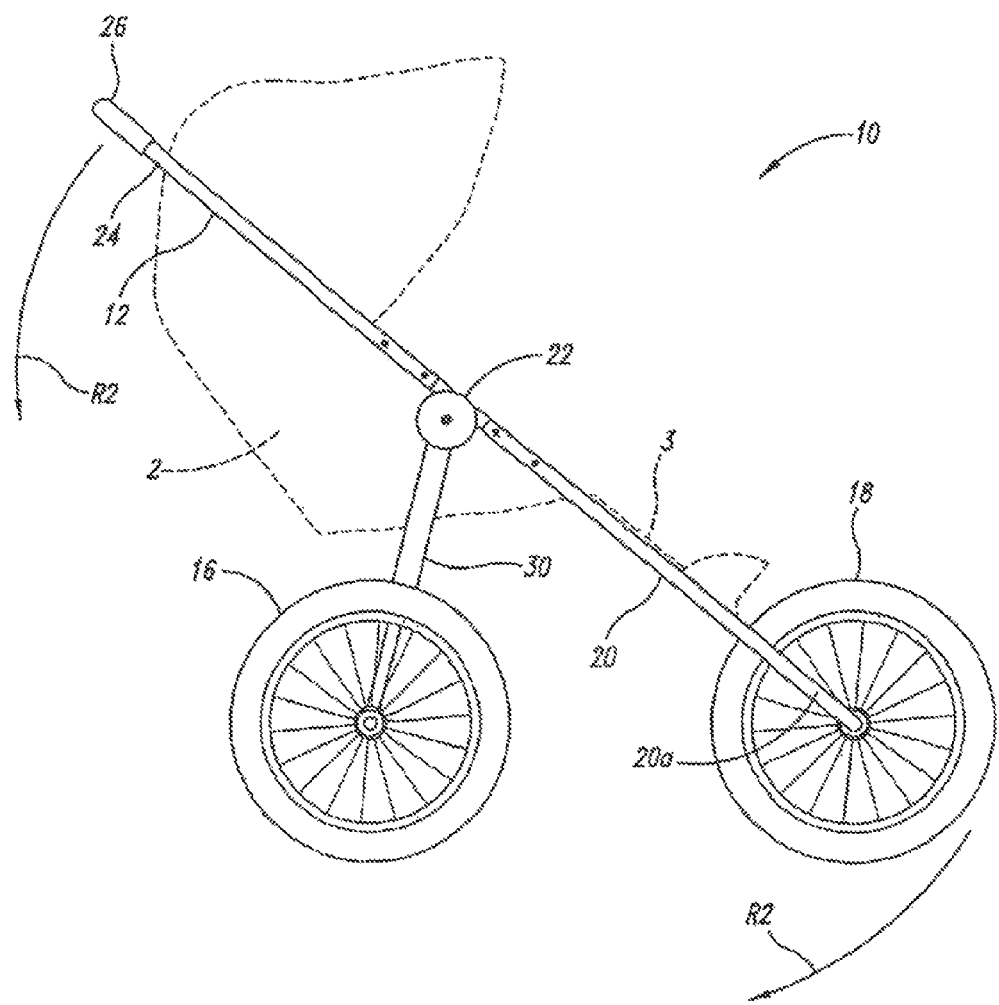
FIG. 4 is a side elevational view of the stroller frame of FIG. 2.
Figure 5:
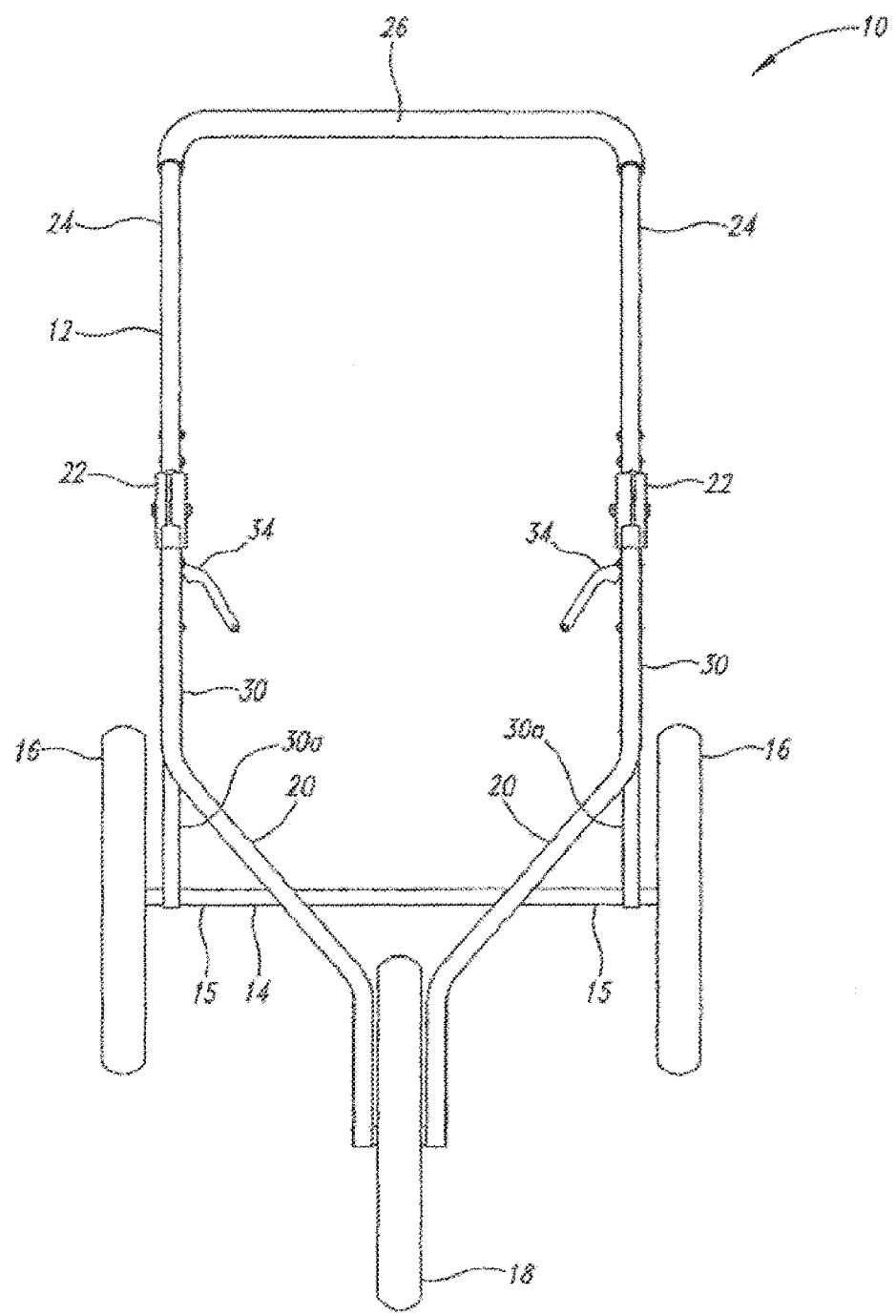
FIG. 5 is a front elevational view of the stroller frame of FIG. 2 shown in a partially folded state with left and right front supports being rotated about their respective side folding assemblies toward respective side rear wheel supports.
Figure 6:
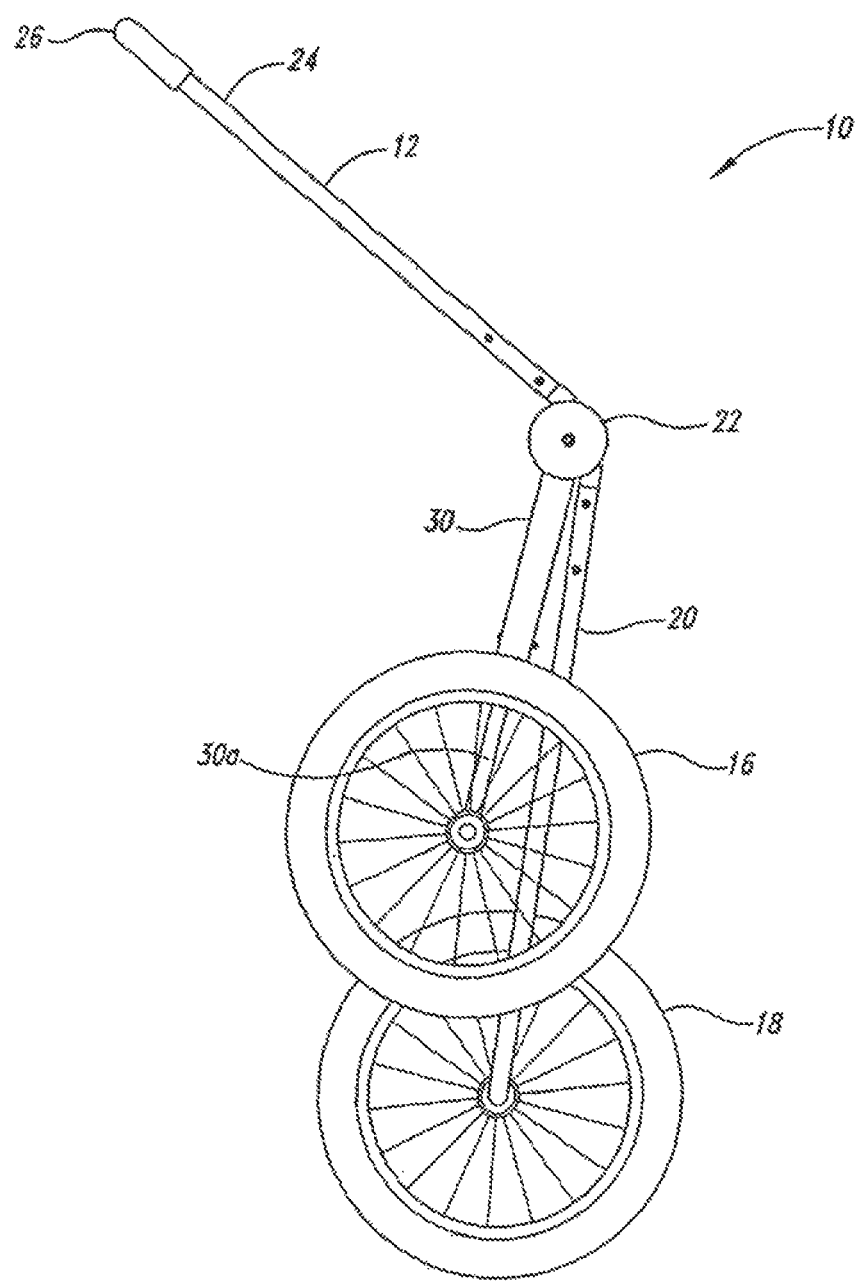
FIG. 6 is a side elevational view of the stroller frame of FIG. 2 shown in the partially folded state of FIG. 5.
Figure 7:
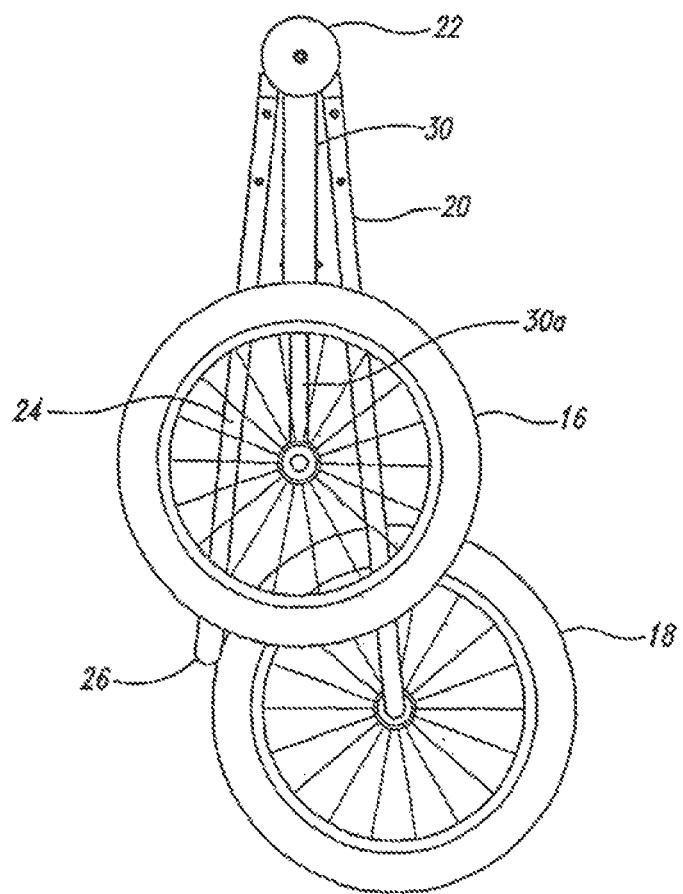
FIG. 7 is a side elevational view of the stroller frame of FIG. 2 shown in a fully folded state with both left and right front supports and left and right side handle supports being rotated about their respective side folding assemblies toward respective side rear wheel supports.

With each of the left and right folding assemblies 22 in an unlocked state, the left and right handle supports 24, along with the handle 26, and the left and right forward wheel support 20, along with the forward wheel 18, can be rotated about the left and right folding assemblies, respectively, toward the left and right rear wheel supports 30, respectively, as depicted by arrows R2 shown in FIG. 4. As stated, the forward wheel supports 20 can be moved independently from movement of the handle supports 24. In the process of folding the frame 12, if the forward wheel supports 20 were to be rotated about the folding assemblies 22 before rotation of the handle supports 24 about the folding assemblies, then the frame 12 would appear in a partially folded state as shown in the front elevational view of FIG. 5 and the side elevational view of FIG. 6. In a fully folded state, both the forward wheel supports 20 and the handle supports 24 have been rotated about the folding assemblies 22 to be positioned in close proximity to the rear wheel supports 30 as shown in the side elevational view of FIG. 7.

Figure 8:
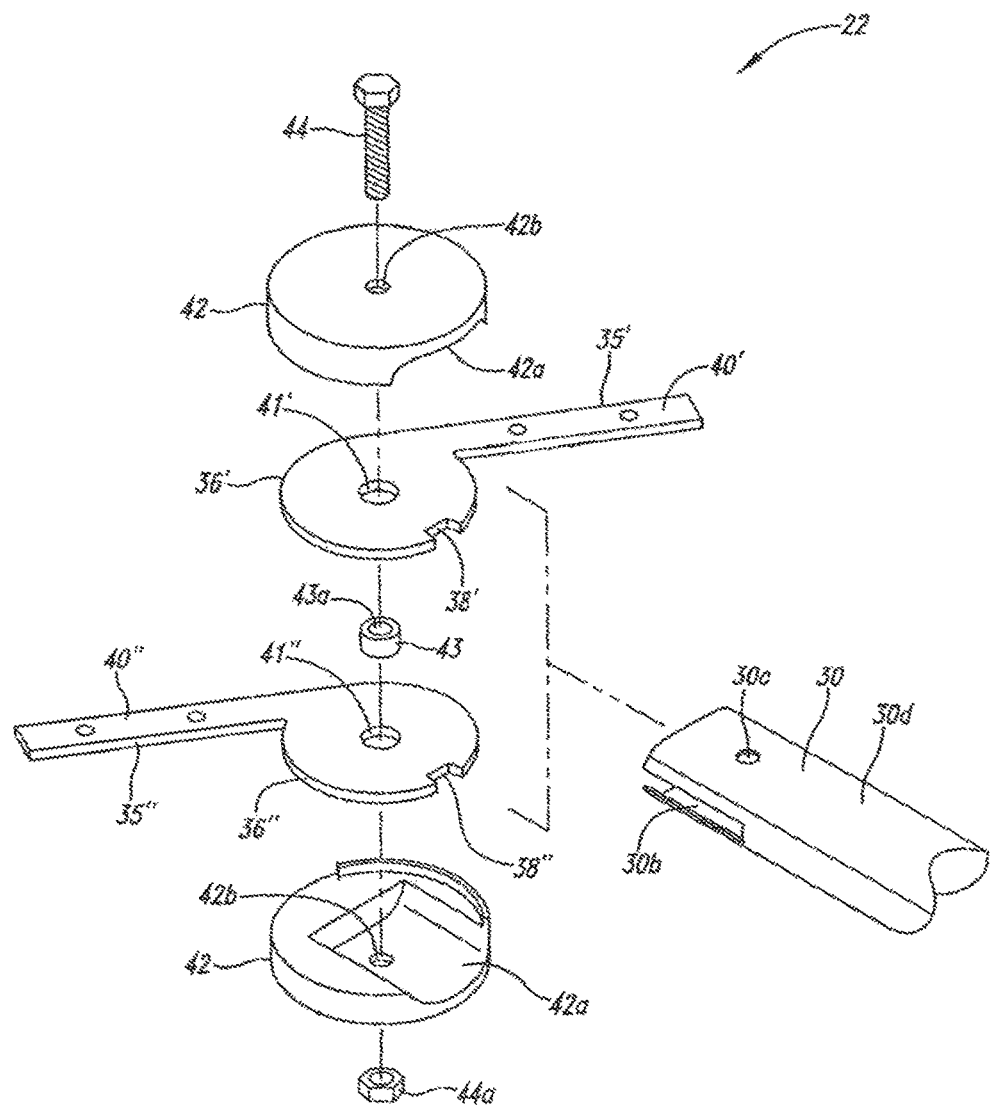
FIG. 8 is an exploded isometric view of one of left and right side folding assemblies of the implementation shown in FIG. 1.

As shown in FIG. 8, each of the folding assemblies 22 includes a forward rotatable member 35' having a disk 36' with a notch 38' and an arm 40', and a rearward rotatable member 35" having a disk 36" with a notch 38" and an arm 40". The disks 36' and 36" and the arms 40' and 40" are depicted in FIG. 8 as being part of a single formed piece; however, in other implementations the disks and arms are individual pieces that are fixedly attached together. The rotatable members 35' and 35", along with a corresponding one of the rear wheel supports 30, are contained between left and right slotted halves of a housing 42 that allow the arms 40' and 40" to protrude outside of the housing. The inside wall of each half of the housing 42 has recess 42a sized and shaped such that when the two halves of the housing are positioned together, the recesses form a cavity to securely receive the upper free-end portion of the rear wheel support 30 therein. The disks 36' and 36" each have a central aperture 41' and 41", respectively, sized to receive a bushing 43 therethrough having a length longer than the cumulative thickness of the two disks. When the folding assembly 22 is assembled, the disks 36' and 36" are arranged facing each other with the bushing 43 extending through the aligned apertures 41' and 41" of the disks, and this subassembly is positioned in a slot 30b in the enlarged, upper free-end portion of the real wheel support 30. The slot 30b has a forward to rearward orientation. A central aperture 43a of the bushing 43 is aligned with a pair of opposing inward and outward side apertures 30c of the rear wheel support 30, transverse to the orientation of the slot 30b, and the left and right slotted halves of the housing 42 clamp around the slotted upper free-end portion of the rear wheel support 30. The left and right slotted halves of the housing 42 have opposing apertures 42b, which align with the central aperture 43a of the bushing 43, such that a bolt 44 extends fully through the apertures 42b of the halves of the housing 42, through the aperture 30c of the rear wheel support 30, and through the central aperture 43a of the bushing 43. A nut 44a is threaded onto the threaded end of the bolt 44 to hold the assembly together with the disks 36' and 36" freely rotatable on the bushing 43. With this assembly, the bolt 44 and nut 44a hold the left and right slotted halves of the housing 42 securely clamped together with the slots of the housing having the arms 40' and 40" extending therethrough. The arm 40' extends forwardly through the forward opening of the slot 30b and the other arm 40" extends rearwardly through the rearward opening of the slot 30b in the rear wheel support 30.

Figure 9:
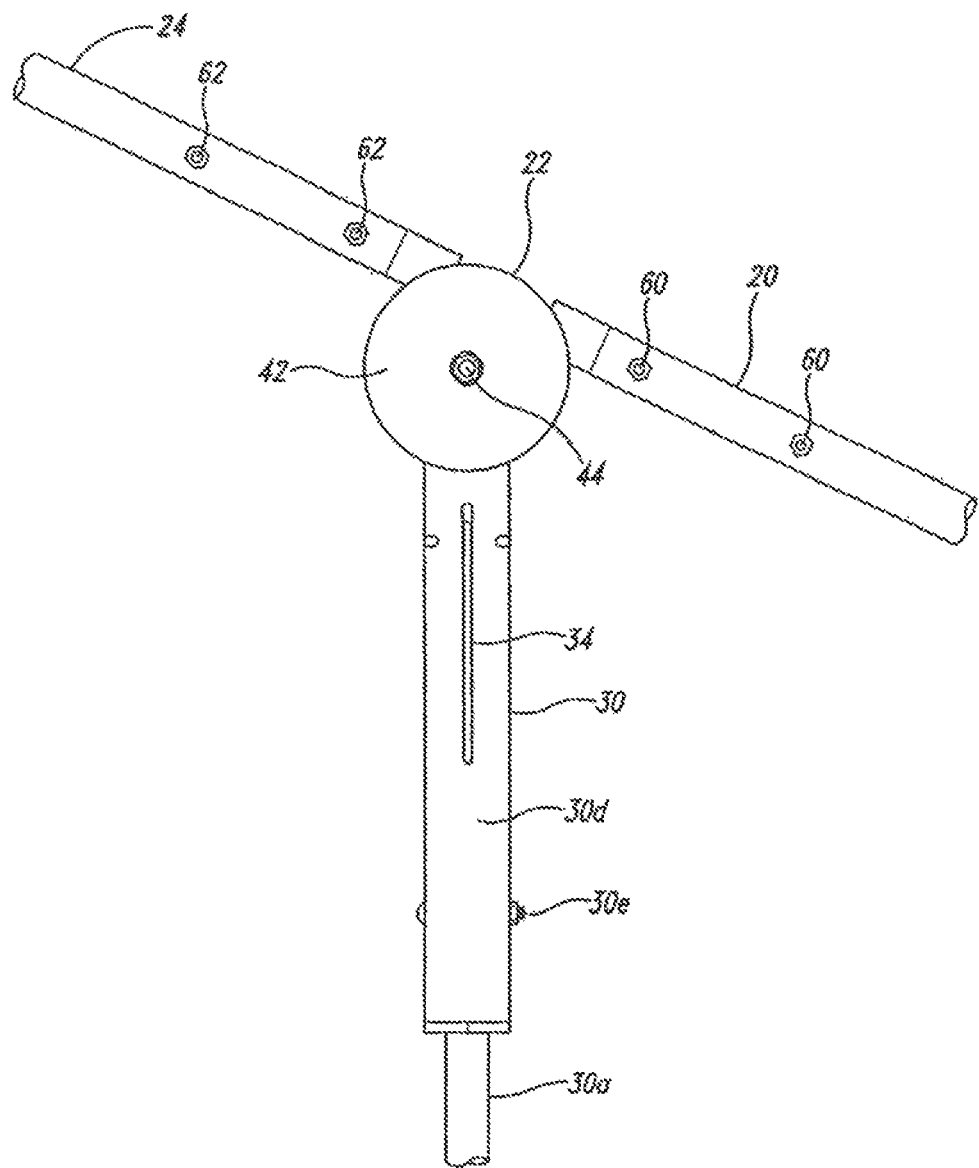
FIG. 9 is an enlarged, fragmentary, side elevational view of the stroller frame of FIG. 2 in the fully unfolded state better illustrating one of the side folding assemblies.
Figure 10:
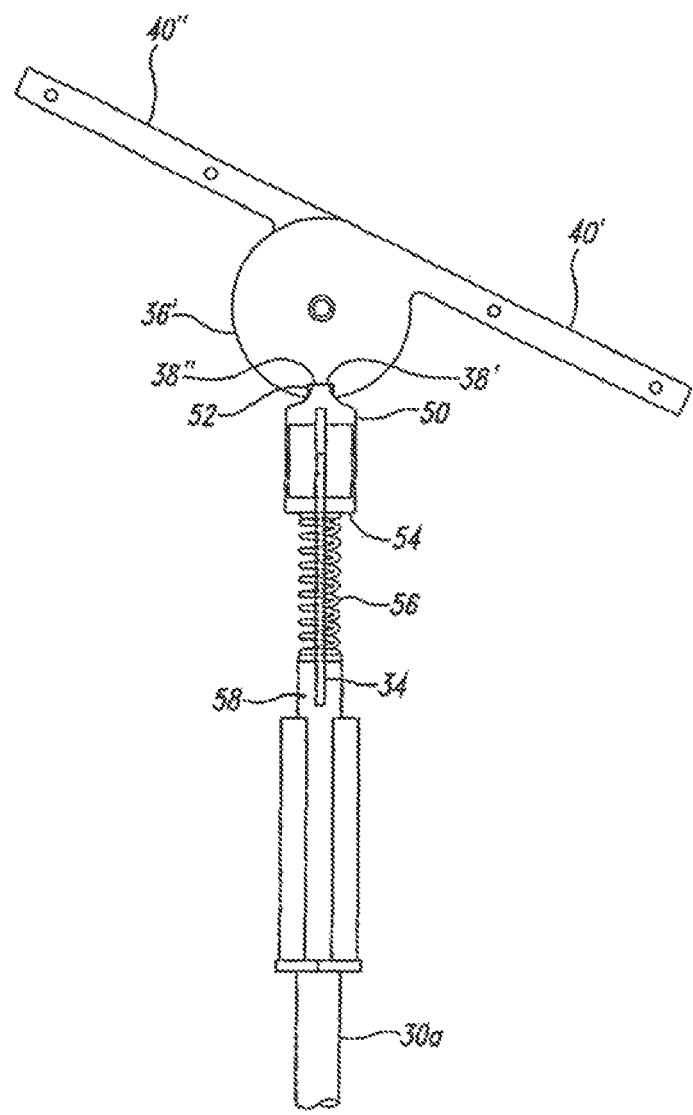
FIG. 10 is a side elevational view of the stroller frame in the fully unfolded state of FIG. 9 showing internal components of one of the side folding assemblies.

When the folding assemblies 22 are in a fully unfolded state, as shown in FIG. 9, the disks 36' and 36" of the folding assembly are locked in place by components positioned internal to the rear wheel supports 30 including a slidably mounted head 50 with a tip 52 inserted into the notches 38' and 38" as shown in FIG. 10. In FIG. 10, a cover portion 30d of the upper free-end portion of the rear wheel support 30 is shown removed in order to better illustrate the components of the folding assembly 22 contained therein. The cover portion 30d is attached to the other portion of the free-end portion of the rear wheel support 30 by a bolt 30e, as seen in FIG. 9. The lever 34 is pivotally mounted to the rear wheel support 30 and the head 50 is mechanically linked to the lever 34 so that when the lever 34 is pulled upward and inward as depicted by the arrows R1 in FIG. 5, the head 50 is moved away from the disks 36' and 36", thereby causing the tip 52 to be retracted and disengaged from the notches 38' and 38". The disks 36' and 36" are then free to rotate on the bolt 44 and hence allow folding of the front wheel support 20 and the handle support 24 about the rear wheel support 30 in a clam shell movement, as will be explained in greater detail below.

The head 50 further includes a base 54, which rests against one end of a spring 56. The other end of the spring 56 rests against an internal support 58 inside the rear wheel support 30 such that the spring provides a force adequate to bias the tip 52 into an engaged state within the notches 38' and 38" of the disks 36' and 36" when the folding assembly 22 is in the fully unfolded state. While supplying a force to the head 50 to keep the tip 52 in the notches 38' and 38", the force is not so great as to require undue force to be applied to the lever 34 by the user to retract and disengage the tip from the notches when the folding assembly is to be folded.

Figure 11:
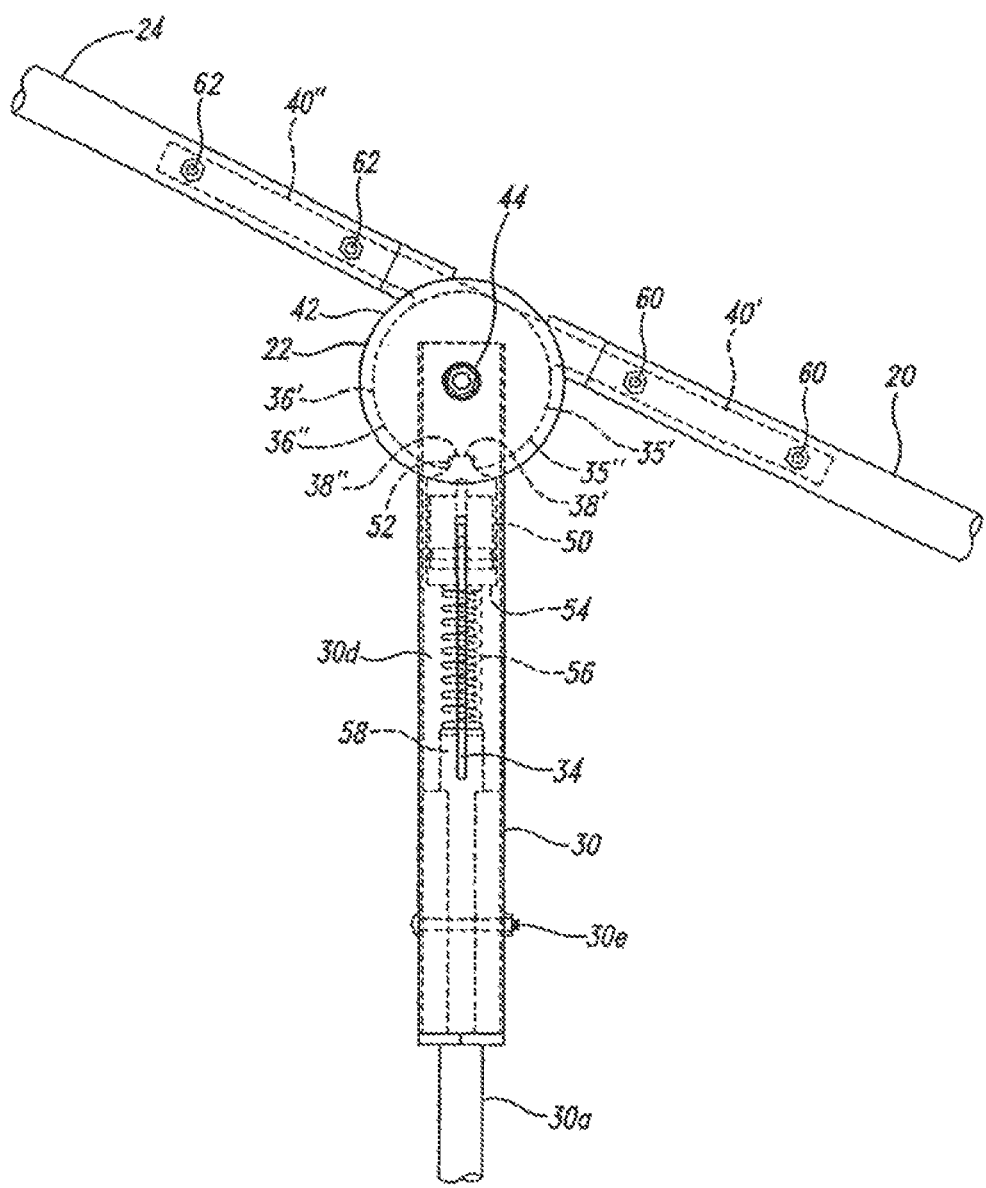
FIG. 11 is the side elevational view of the stroller frame in the fully unfolded state of FIG. 9 with the internal components of the side folding assembly shown in broken line.
Figure 12:
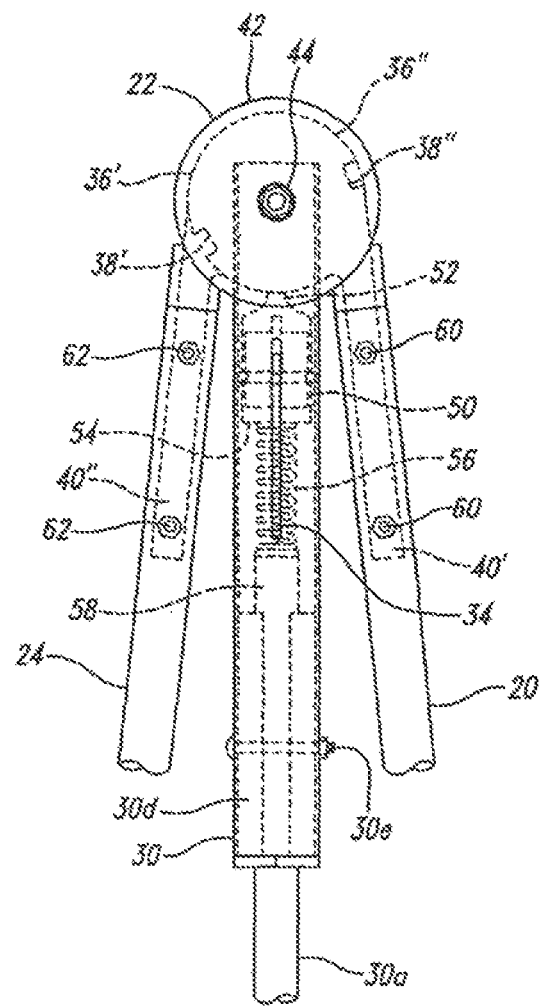
FIG. 12 is the side elevational view of the stroller frame of FIG. 11 in the fully folded state with the internal components of the side folding assembly shown in broken line.

The internal support 58 is coupled to or may be an integral part of the rearward free-end 30a of the rear wheel support 30 to couple the folding assembly 22 to the rear axle assembly 14. As shown in FIGS. 11 and 12, for each of the folding assemblies 22 on the left and right sides of the stroller 12, the front wheel support 20 is bolted onto the arm 40' of the forward rotatable member 35' using a pair of bolts 60, and the handle support 24 is bolted onto the arm 40" of the rearward rotatable member 35" using a pair of bolts 62.

In the fully folded state of the stroller 12, both the front wheel support 20 and the handle support 24 are moved into close proximity to the rear wheel support 30. As shown in FIG. 12, in the fully folded state, the tip 52 of the head 50 is retracted and disengaged from the notch 38' of the forward rotatable member 35' and the notch 38" of the rearward rotatable member 35". In the fully folded state, both the front wheel support 20 and the handle support 24 are free to rotate independently of the other about the bolt 44 of the folding assembly 22 so that the notches 38' and 38" can be brought back into alignment with the tip 52 of the head 50 to consequently secure the stroller 12 into the fully folded state.

From the foregoing it will be appreciated that, although specific embodiments of the invention have been described herein for purposes of illustration, various modifications may be made without deviating from the spirit and scope of the invention. For instance, the depicted implementation used the bolt 44 and nut 44a assembly to rotatably couple the forward rotatable member 35' and the rearward rotatable member 35" together with a corresponding one of the rear wheel supports 30. In other implementations, pivot members other than the bolt-nut assembly may be used, including pin assemblies. As another example, in the depicted implementation, the rear wheel supports 30 supported the bolt 44 on which the rotatable members 35' and 35" where rotably mounted. In other implementations, either the front wheel support 20 can support the bolt 44 and have the rotatable members 35' and 35" rotatably mounted thereon with the arms 40' and 40" each fixedly attached to one of the handle support 24 and the rear wheel support 30 such that the handle support and the rear wheel support fold about the front wheel support, or the handle support 24 can support the bolt 44 and have the rotatable members 35' and 35" rotatably mounted thereon with the arms 40' and 40" each fixedly attached to one of the front wheel supports 20 and the rear wheel support 30 such that the front wheel support and the real wheel support fold about the handle support. As a further example, the rotatable members 35' and 35" were depicted as including the disks 36' and 36", however, in other implementations the rotatable members 35' and 35" may have other shapes. As an additional example, the depicted implementation aligned the tip 52 of the spring loaded head 50 of each folding assembly 22 with the notches 38' and 38" of the disks 36' and 36" to secure the stroller 12 into the fully folded state. In other implementations, each folding assemblies 22 can use a pin or other member that is inserted into holes in each of the disks 36' and 36" to hold the front wheel supports 20, the handle supports 24, and the rear wheel supports 30 in the unfolded state. Accordingly, the invention is not limited except as by the appended claims.

We claim:

1. A folding assembly for a foldable stroller having a front wheel support, a handle member and a rear wheel support movable into an unfolded state, the folding assembly, comprising:
   a pivot member mounted on the rear wheel support;
   a first rotatable member comprising a first arcuate perimeter and rotatably mounted on the pivot member, the first arcuate perimeter comprising a first notch; and
   a second rotatable member comprising a second arcuate perimeter and rotatably mounted on the pivot member to rotate relative to the first rotatable member about a common axis, the second arcuate perimeter comprising a second notch;
   a single locking member slidably mounted to the rear wheel support and configured to be slidable along an axis parallel to the longitudinal axis of the rear wheel support and received simultaneously by the first notch of the first rotatable member and the second notch of the second rotatable member
   when the first and second rotatable members are rotated about the pivot member to position the foldable stroller into an unfolded state, thereby supporting and locking the folding assembly in the unfolded state; and
   wherein the first rotatable member being configured for attachment to the front wheel support for movement therewith, and the second rotatable member being configured for attachment to the handle member for movement therewith.

2. The folding assembly of claim 1, wherein the front wheel support and the handle portion move towards and approach opposite sides of the rear wheel support when the folding assembly is moved from an unfolded state to a folded state.

3. The folding assembly of claim 2, wherein the first and second rotatable members each have a planar arm projecting therefrom and in coplanar relation therewith, the front wheel support being fixedly attached to the planar arm of the first rotatable member and the handle member being fixedly attached to the planar arm of the second rotatable member.

4. The folding assembly of claim 3, wherein the front wheel support is bolted onto the planar arm of the first rotatable member and the handle member is bolted onto the planar arm of the second rotatable member.

5. The folding assembly of claim 1, wherein the locking member rests against a spring such that the spring provides a force adequate to bias the locking member into an engaged state within the first notch and second notch.

6. The folding assembly of claim 5, wherein the first notch and second notch are in alignment when the folding assembly is in an unfolded state.

7. The folding assembly of claim 1, wherein each of the notches of the first rotatable member and the second rotatable member comprise a first radial surface, a second radial surface, and a bottom surface, the first radial surface and second radial surface extending radially inward from the arcuate perimeter, and the bottom surface extending between the first radial surface and the second radial surface to form the notch.

8. The folding assembly of claim 1, wherein the first radial surface, second radial surface, and bottom surface define a notch profile.

9. The folding assembly of claim 1, wherein the locking member further comprises a distal end, the distal end having a distal end profile configured for mating with the notch profile.

10. A foldable baby stroller frame for use with at least one front wheel and at least one rear wheel, comprising:
    left and right side laterally spaced-apart first members, each of the first members having a first end portion and a second end portion;
    left and right side laterally spaced-apart second members, each of the second members having a first end portion and a second end portion;
    left and right side laterally spaced-apart third members, each of the third members having a first end portion and a second end portion, at least one of the first end portions of the first members having a mounting portion configured for mounting of the at least one front wheel thereto, at least one of the first end portions of the second members having a mounting portion configured for mounting of the at least one rear wheel thereto, and at least one of the first end portions of the third members having a handle portion; and
    left and right side laterally spaced-apart folding assemblies, each of the left and right side folding assemblies having a first rotatable member comprising a first arcuate perimeter, the first arcuate perimeter comprising a first notch, and a second rotatable member comprising a second arcuate perimeter, the second arcuate perimeter comprising a second notch, wherein the first rotatable member and second rotatable member are rotatably mounted on a pivot member to pivot about a common axis,
      one of the second end portions of a first one of the first, second, and third members being fixedly attached to the first rotatable member,
      one of the second end portions of a different second one of the first, second, and third members being fixedly attached to the second rotatable member, and
      one of the second end portions of another different third one of the first, second, and third members attached to the pivot member as a pivot member support,
    wherein the left and right folding assemblies each further include a single locking member slidably mounted to one of the corresponding left and right side pivot member supports and slidable along an axis parallel to the longitudinal axis of the pivot member support, and
    wherein the first and second notches simultaneously receive the single locking member therein when the first and second rotatable members are rotated about the pivot member to position the handle member, the front wheel support, and the rear wheel support in an unfolded state.

11. The foldable baby stroller frame of claim 10, wherein the first and second rotatable members are first and second plates, respectively, arranged in juxtaposition.

12. The foldable baby stroller frame of claim 11, wherein the first and second plates each have a planar arm projecting therefrom and in coplanar relation therewith, the one of the second end portions attached to the first rotatable member being fixedly attached to the arm of the first plate and the one of the second end portions attached to the second rotatable member being fixedly attached to the arm of the second plate.

13. The foldable baby stroller frame of claim 12, wherein the first and second plates each have a central aperture and wherein the pivot member includes a bushing passing through the central apertures of the first and second plates for rotation thereabout.

14. The foldable baby stroller frame of claim 10, wherein the one of the second end portions supporting the pivot member includes laterally inward and outward wall portions defining a chamber therebetween, the first and second rotatable members being rotatably positioned within the chamber.

15. The foldable baby stroller frame of claim 14, wherein the chamber has a forward opening and a rearward opening, and wherein each of the first and second rotatable members includes an attachment portion for attachment to the second end portions of the first and different second ones of the first, second, and third members fixedly attached to the first and second rotatable members, the attachment portion of one of the first and second rotatable members extending forward through the forward opening and the attachment portion of the other of the first and second rotatable members extending rearward through the rearward opening.

16. A folding assembly usable with a foldable device having first, second and third frame members movable into an unfolded state, comprising:
   a first rotatable member rotatably mounted on a pivot member and comprising a first arcuate perimeter, the first arcuate perimeter comprising a first notch; and
   a second rotatable member rotatably mounted on the pivot member and comprising a second arcuate perimeter, the second arcuate perimeter comprising a second notch, the second rotatable member being rotatable relative to the first rotatable member about a common axis in first and second spaced apart rotational planes, respectively, the first rotatable member being configured for attachment to a first one of the first, second and third frame members for movement therewith, the second rotatable member being configured for attachment to a different second one of the first, second and third frame members for movement therewith, and the pivot member being configured for support by a different third one of the first, second and third frame members,
   a single locking member, slidable along an axis parallel to the longitudinal axis of the pivot member,
   wherein the first and second notches simultaneously receive the single locking member therein when the first and second rotatable members are rotated about the pivot member to position the first, second and third frame members in the unfolded state.

17. The folding assembly of claim 16, wherein the locking member is configured for support by the different third one of the first, second and third frame members.

18. The folding assembly of claim 16, wherein the locking member is a pin.

19. The folding assembly of claim 16, wherein the locking member rests against a spring such that the spring provides a force adequate to bias the locking member into an engaged state within the notches of the first and second rotatable members.

20. The folding assembly of claim 16, wherein the first and second notches are in alignment when the folding assembly is in an unfolded state.

* * * * *